US008121157B2

(12) United States Patent
Maki et al.

(10) Patent No.: US 8,121,157 B2
(45) Date of Patent: Feb. 21, 2012

(54) TERAHERTZ BEAM SCANNING APPARATUS AND METHOD THEREOF

(75) Inventors: Ken-ichiro Maki, Saitama (JP); Takayuki Shibuya, Saitama (JP); Chiko Otani, Saitama (JP); Kodo Kawase, Saitama (JP)

(73) Assignee: Riken, Saitama (JP)

( * ) Notice: Subject to any disclaimer, the term of this patent is extended or adjusted under 35 U.S.C. 154(b) by 0 days.

(21) Appl. No.: 12/989,368

(22) PCT Filed: Apr. 21, 2009

(86) PCT No.: PCT/JP2009/057909
§ 371 (c)(1),
(2), (4) Date: Oct. 22, 2010

(87) PCT Pub. No.: WO2009/131113
PCT Pub. Date: Oct. 29, 2009

(65) Prior Publication Data
US 2011/0037001 A1    Feb. 17, 2011

(30) Foreign Application Priority Data
Apr. 25, 2008    (JP) .................................. 2008-115034

(51) Int. Cl.
*H01S 3/10* (2006.01)
(52) U.S. Cl. .................. 372/21; 372/22; 372/24
(58) Field of Classification Search .......... 372/15, 372/16, 21, 22, 24
See application file for complete search history.

(56) References Cited

FOREIGN PATENT DOCUMENTS
| JP | 2003-005238 A | 1/2003 |
| JP | 2006-215222 A | 8/2006 |
| JP | 2006-224142 A | 8/2006 |
| JP | 2007-103997 A | 4/2007 |
| JP | 2008-005205 A | 1/2008 |

OTHER PUBLICATIONS

International Search Report issued in corresponding Appln. No. PCT/JP2009/057909, completed May 20, 2009, completed Jun. 2, 2009.
Adrian Dobroiu et al., "THz-Wave Spectroscopy Applied to the Detection of Illicit Drugs in Mail," IEEE Photonics Technology Letters, Oct. 1, 2006, vol. 18, No. 19, pp. 2008-2010.
Jun-ichi Nishizawa et al., "Continuous-Wave Frequency-Tunable Terahertz-Wave Generation from GaP", IEEE Photonics Technology Letters, Oct. 1, 2006, vol. 18, No. 19, pp. 2008-2010.
Extended European Search Report issued on Oct. 31, 2011 in corresponding European Patent Application No. 09734351.1.
Maki K-I et al., "Terahertz beam steering and frequency tuning by using the spatial dispersion of ultrafast laser pulses", Optics Express Optical Society of America USA, vol. 16, No. 14, Jun. 23, 2008, pp. 10158-10169, XP002651574.
Brown E R et al., "Terahertz photomixing in low-temperature-grown GaAs", Proceedings of SPIE—the International Society for Optical Engineering—Advanced Technology MMW, Radio, and Terahertz Telescopes 1998 SPIE US, vol. 3357, 1998, pp. 132-142, XP002661575.

*Primary Examiner* — Armando Rodriguez
(74) *Attorney, Agent, or Firm* — Griffin & Szipl, P.C.

(57) ABSTRACT

To provide a terahertz beam scanning apparatus and method that can scan a terahertz beam at high speed over a wide angle. The terahertz beam scanning apparatus includes: a laser device 12 that generates a first laser beam 1 and a second laser beam 2 having different wavelengths; a laser optical system 14 that focuses the first laser beam 1 and the second laser beam 2 on a same common focal point 14b; and a terahertz generator 16 that is located at the common focal point and generates a terahertz beam 4 by difference frequency mixing. The laser optical system 14 is configured to be capable of changing a relative incidence $\theta_i$ between the first laser beam and the second laser beam to the terahertz generator.

6 Claims, 9 Drawing Sheets

TERAHERTZ BEAM SCANNING APPARATUS AND METHOD THEREOF

This is a National Phase Application in the United States of International Patent Application No. PCT/JP2009/057909 filed Apr. 21, 2009, which claims priority on Japanese Patent Application No. 2008-115034, filed Apr. 25, 2008. The entire disclosures of the above patent applications are hereby incorporated by reference.

BACKGROUND OF THE INVENTION

1. Technical Field of the Invention

The present invention relates to a terahertz beam scanning apparatus and method for scanning a terahertz beam.

2. Description of the Related Art

Terahertz waves are electromagnetic waves that lie between radio waves and infrared radiation and are 0.3 THz to 10 THz in frequency (30 µm to 1 mm in wavelength). Such terahertz waves have penetrability to various substances such as paper and plastics and a proper spatial resolution, and are expected to serve as a practical tool for radioscopic imaging of various objects. Previous studies have demonstrated usefulness of terahertz waves.

However, in conventional radioscopic imaging that uses terahertz waves, a sample is irradiated with a focused beam of a terahertz wave (hereafter a terahertz wave having directionality is referred to as a "terahertz beam"), where the terahertz beam is scanned by mechanically moving the sample itself. A scanning speed of the terahertz beam is limited by this mechanical operation. Thus, there is a problem that radioscopic imaging requires a long time.

In view of this, to accelerate radioscopic imaging that uses terahertz waves, means for scanning the terahertz beam while fixing the sample have already been proposed in Patent Documents 1 to 3.

In Patent Document 1, a galvano-scanner mirror is used in laser beam scanning.

In Patent Document 2, the terahertz beam is scanned using a phased array antenna.

In the invention of Patent Document 2, when generating the terahertz wave by difference frequency mixing using two laser beams that differ in wavelength, a wave front of the terahertz beam is indirectly tilted by shifting a phase difference of the laser beams through the use of an optical phase shifter for each array element, thereby scanning the terahertz beam.

In Patent Document 3, the beam is scanned by controlling a whole array phase altogether through the use of one spatial optical phase modulator, instead of a lot of optical phase shifters in Patent Document 2.

[Patent Document 1]
Japanese Patent Application Laid-Open No. 2006-224142, "Laser Scanner and Laser Marking Apparatus, and Laser Marking Method"

[Patent Document 2]
Japanese Patent Application Laid-Open No. 2007-103997, "Electromagnetic Wave Emission Device"

[Patent Document 3]
Japanese Patent Application Laid-Open No. 2008-5205, "Optical Control Type Phased Array Radar Apparatus"

The galvano-scanner mirror in Patent Document 1 has a problem of a slow operation speed of 1 kHz (1000 times per second) at the maximum, because the mirror is mechanically operated.

In Patent Document 2, the optical phase shifter is used for each array element. In the case of increasing an array scale, there is a problem of increases in size and cost of the entire device because a lot of phase shifters corresponding to the number of elements are needed.

Besides, though research has been conducted on an electrical phase shifter using a liquid crystal in a terahertz band, an amount of phase shift has so far been insufficient, making it difficult to scan the terahertz beam at high speed over a wide angle.

In Patent Document 3, one spatial optical modulator is employed instead of a lot of phase shifters. However, the modulator has a slow response speed and so is unsuitable for high-speed terahertz beam scanning.

SUMMARY OF THE INVENTION

The present invention has been developed to solve the above-mentioned problems. An object of the present invention is to provide a terahertz beam scanning apparatus and method that can scan a terahertz beam at high speed over a wide angle.

According to the present invention, there is provided a terahertz beam scanning apparatus including:
a laser device that generates a first laser beam and a second laser beam having different wavelengths;
a laser optical system that focuses the first laser beam and the second laser beam on a same common focal point; and
a terahertz generator that is located at the common focal point and generates a terahertz beam by difference frequency mixing,
wherein the laser optical system is configured to be capable of changing a relative incident angle between the first laser beam and the second laser beam to the terahertz generator.

According to a preferred embodiment of the present invention, the laser optical system includes:
a confocal lens system that is located between the common focal point and a first focal point upstream of the common focal point, and focuses the first laser beam passing through the first focal point, on the common focal point;
a beam coupler that is located between the first focal point and the confocal lens system, and reflects the second laser beam passing through a transfer position of the first focal point, onto an optical axis of the confocal lens system; and
a laser beam deflection device that is located at a position of the first focal point or the transfer position, and deflects the first laser beam or the second laser beam passing through the position.

The laser beam deflection device is an electro-optic deflector or a galvano scanner.

According to a preferred embodiment of the present invention, the laser device is a dual wavelength laser device that simultaneously generates the first laser beam and the second laser beam having the different wavelengths.

According to another preferred embodiment of the present invention, the laser device includes: a broadband laser device that generates a broadband laser beam; a dispersive element that spatially disperses a wavelength component of the broadband laser beam; a cylindrical lens that collimates the dispersed broadband laser beam to convert the dispersed broadband laser beam to a linear beam that extends in a single direction in cross sectional shape; a beam splitter that divides the linear beam into a first linear beam and a second linear beam which are approximately identical to each other; and a shift optical system that shifts the first linear beam or the second linear beam in the single direction,
wherein the first linear beam is the first laser beam, and the second linear beam is the second laser beam.

Moreover, according to the present invention, there is provided a terahertz beam scanning method including:

generating a first laser beam and a second laser beam having different wavelengths;

focusing the first laser beam and the second laser beam on a same common focal point, while changing a relative incident angle between the first laser beam and the second laser beam to a terahertz generator; and generating a terahertz beam in a direction in which the incident angle is magnified, by the terahertz generator located at the common focal point.

In the apparatus and the method according to the present invention stated above, the laser optical system is configured to be capable of changing the relative incident angle between the first laser beam and the second laser beam to the terahertz generator. Accordingly, the laser device generates the first laser beam and the second laser beam having different wavelengths, the laser optical system changes the relative incident angle between the first laser beam and the second laser beam to the terahertz generator and focuses the first laser beam and the second laser beam on the same common focal point, and the terahertz generator (e.g. a nonlinear optical element) located at the common focal point generates the terahertz beam in a direction in which the incident angle is magnified.

Moreover, as is clear from the below-mentioned examples, when the terahertz generator (e.g. a nonlinear optical element) is irradiated with the first laser beam and the second laser beam (e.g. two infrared lasers) having different wavelengths to generate the terahertz beam by difference frequency mixing, slightly changing an incident angle of one of the laser beams enables the terahertz beam to be scanned at high speed with an angle several hundred times wider than the incident angle.

In particular, by controlling the incident angle of one of the laser beams using an electro-optic deflector as the laser beam deflection device, the terahertz beam scanning speed can be increased 1000 times as compared with conventional mechanical scanning.

DESCRIPTION OF THE PREFERRED EMBODIMENT

The following describes preferred embodiments of the present invention with reference to drawings. In the drawings, common parts are given the same reference numerals and repeated description is omitted.

(Terahertz Beam Scanning Principle)

Figure 1A:
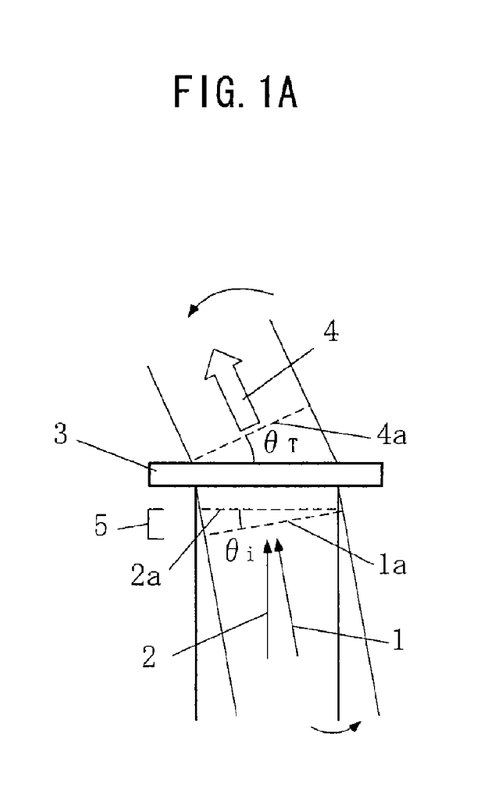
FIGS. 1A to 1C are diagrams showing a terahertz beam scanning principle according to the present invention.
Figure 1B:
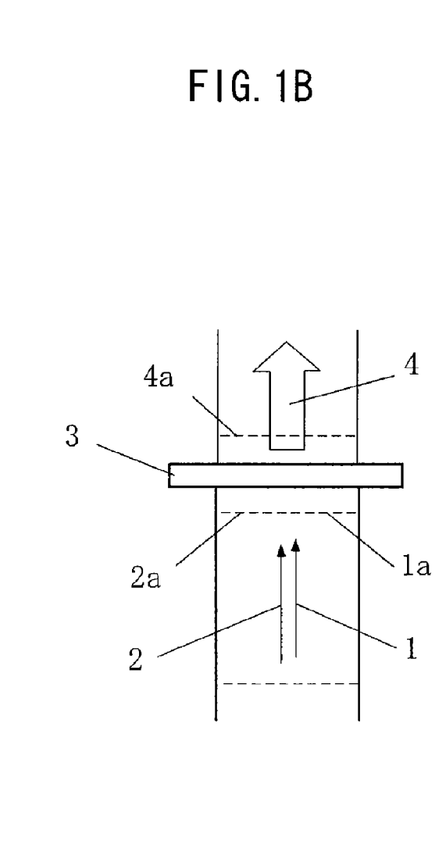
Figure 1C:
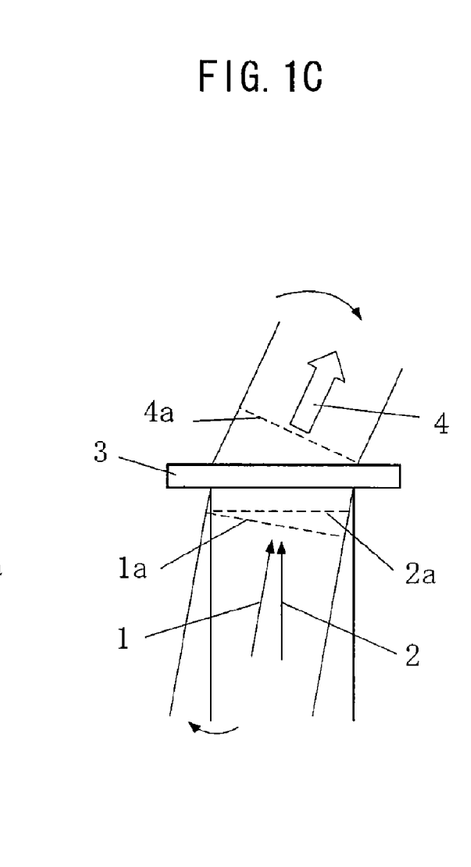

FIGS. 1A to 1C are diagrams showing a terahertz beam scanning principle according to the present invention. FIG. 1A shows a situation where a terahertz beam is directed to the left, FIG. 1B shows a situation where the terahertz beam is directed to the front, and FIG. 1C shows a situation where the terahertz beam is directed to the right.

In FIGS. 1A to 1C, reference numeral 1 is a first laser beam, 1a is a wave front of the first laser beam, 2 is a second laser beam, 2a is a wave front of the second laser beam, 3 is a terahertz generator (a nonlinear optical element in this example), 4 is a terahertz beam, 4a is a wave front of the terahertz beam, $\theta_i$ is a relative incident angle between the first laser beam 1 and the second laser beam 2 to the terahertz generator (an incident angle of the first laser beam 1 in this example), and $\theta_T$ is a radiation angle of the terahertz beam.

A phase property in difference frequency mixing is utilized in the present invention. Difference frequency mixing is a means of generating the terahertz beam 4 by irradiating the terahertz generator 3 (a nonlinear optical element in this example) with the two laser beams 1 and 2 (the first laser beam and the second laser beam) that differ in wavelength, as shown in FIG. 1B.

In addition, when the incident angle of the first laser beam 1 as one of the laser beams is slightly tilted, a phase difference 5 between the first laser beam 1 and the second laser beam 2 as the other laser beam linearly changes depending on position, as shown in FIGS. 1A and 1C. An electromagnetic wave generated from the two laser beams 1 and 2 at this time is expressed by Equation (1) of Formula 1, based on second-order nonlinear optical effects.

[Formula 1]

$$(E_1 + E_2)^2 = \{|E_1|\cos\omega_1 t + |E_2|\cos(\omega_2 t + \Delta\phi)\}^2 = \quad (1)$$
$$\frac{1}{2}(|E_1|^2 + |E_2|^2) + \left\{\frac{1}{2}|E_1|^2\cos 2\omega_1 t + \frac{1}{2}|E_2|^2\cos(2\omega_2 t + \Delta\phi)\right\} +$$
$$\frac{|E_1||E_2|}{2}\cos\{(\omega_1 + \omega_2)t + \Delta\phi\} + \frac{|E_1||E_2|}{2}\cos\{(\omega_1 - \omega_2)t - \Delta\phi\}$$

Here, $E_1$ and $E_2$ respectively denote electric fields of the two laser beams, $|E_1|$ and $|E_2|$ respectively denote amplitudes of the two laser beams, $\omega_1$ and $\omega_2$ respectively denote angular frequencies of the two laser beams, t denotes a time, and $\Delta\phi$ denotes a phase difference between the two laser beams. As can be understood based on the angular frequencies included in each term, the terms in Equation (1) represent signals of a direct current component, a second harmonic component, a sum frequency component, and a difference frequency component, respectively. Since the terahertz wave is generated by difference frequency mixing in this example, the expression of the fourth term is rewritten as shown by Equation (2) of Formula 2.

Here, $\omega_T$ is an angular frequency of the terahertz wave, where Equation (2a) $\omega_1 - \omega_2 = \omega_T$ is satisfied.

Equation (2) indicates that a phase of the generated terahertz wave is equal to the phase difference between the two laser beams. Accordingly, as shown in FIGS. 1A and 1C, when tilting an incident direction of the first laser beam 1 as one of the laser beams, the phase of the terahertz beam 4 generated from each position also changes, and the wave front 4a of the terahertz beam 4 radiated from the whole element is tilted. This tilts a traveling direction of the terahertz beam 4. Hence, the terahertz beam 4 can be scanned (moved from side to side in the drawing) by controlling the incident angle $\theta_i$ of the first laser beam 1 as one of the laser beams.

Moreover, a most significant feature of the present invention is a magnitude of a scanning angle of the terahertz beam 4.

In FIG. 1A, the phase difference between the two laser beams caused by tilting the incidence of the first laser beam 1 to the left is expressed by Equation (3) of Formula 2.

Here, $k_i$ is a wave number of the laser beam, and x is a position on the element. Likewise, a phase distribution of the terahertz beam 4 generated from the whole element is expressed by Equation (4) of Formula 2.

Here, $k_T$ is a wave number of the terahertz wave. From the phase relation described in Equations (1) and (2), Equation (2b) $\phi_T(x) = \Delta\phi_i(x)$ holds. By combining this and Equations (3) and (4), a relation expressed by Equation (5) of Formula 2 is derived.

[Formula 2]

$$E_T = \frac{|E_1||E_2|}{2}\cos(\omega_T t - \Delta\phi) \quad (2)$$

$$\Delta\phi_i(x) = k_i x \sin\theta_i \quad (3)$$

$$\phi_T(x) = k_T x \sin\theta_T \quad (4)$$

$$\sin\theta_T = \frac{k_i}{k_T}\sin\theta_i \quad (5)$$

Typically, an infrared laser is used for generating the terahertz beam 4, and the wavelength of the terahertz beam 4 is several hundred times longer than that of infrared radiation. That is, the value of $k_i/k_T$ in Equation (5) is very large. Therefore, merely by slightly changing the relative incident angle between the first laser beam and the second laser beam (i.e. the incident angle $\theta_i$ of the first laser beam 1) to the terahertz generator, the terahertz beam 4 is scanned with the radiation angle $\theta_T$ several hundred times wider than the incident angle.

Figure 2:
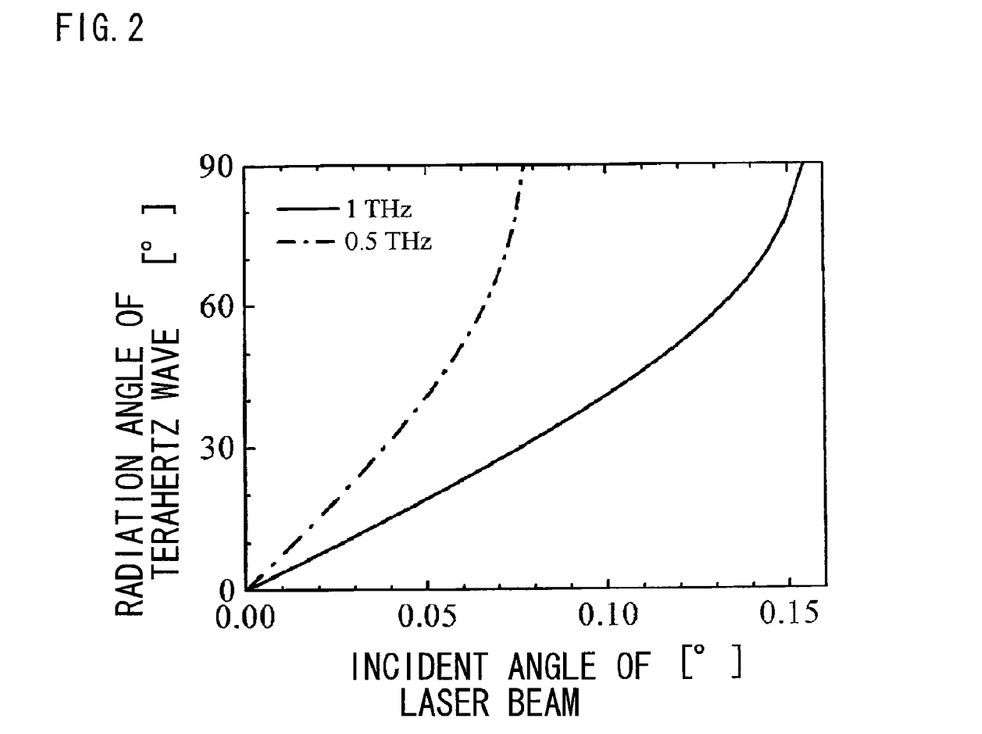
FIG. 2 is a diagram showing a relation between an incident angle $\theta_i$ of a laser beam and a radiation angle $\theta_T$ of a terahertz wave.

FIG. 2 is a diagram showing a relation between the incident angle $\theta_i$ of the laser beam and the radiation angle $\theta_T$ of the terahertz wave.

As shown in the drawing, for example, when the incident angle $\theta_i$ of the laser beam (the first laser beam 1 in the example described above) is changed by ±0.1°, a scanning range (radiation angle) of the terahertz beam 4 reaches ±40° in the case of 1 THz, allowing for wide-angle beam scanning.

(Structure of a Terahertz Beam Scanning Apparatus)

Figure 3:
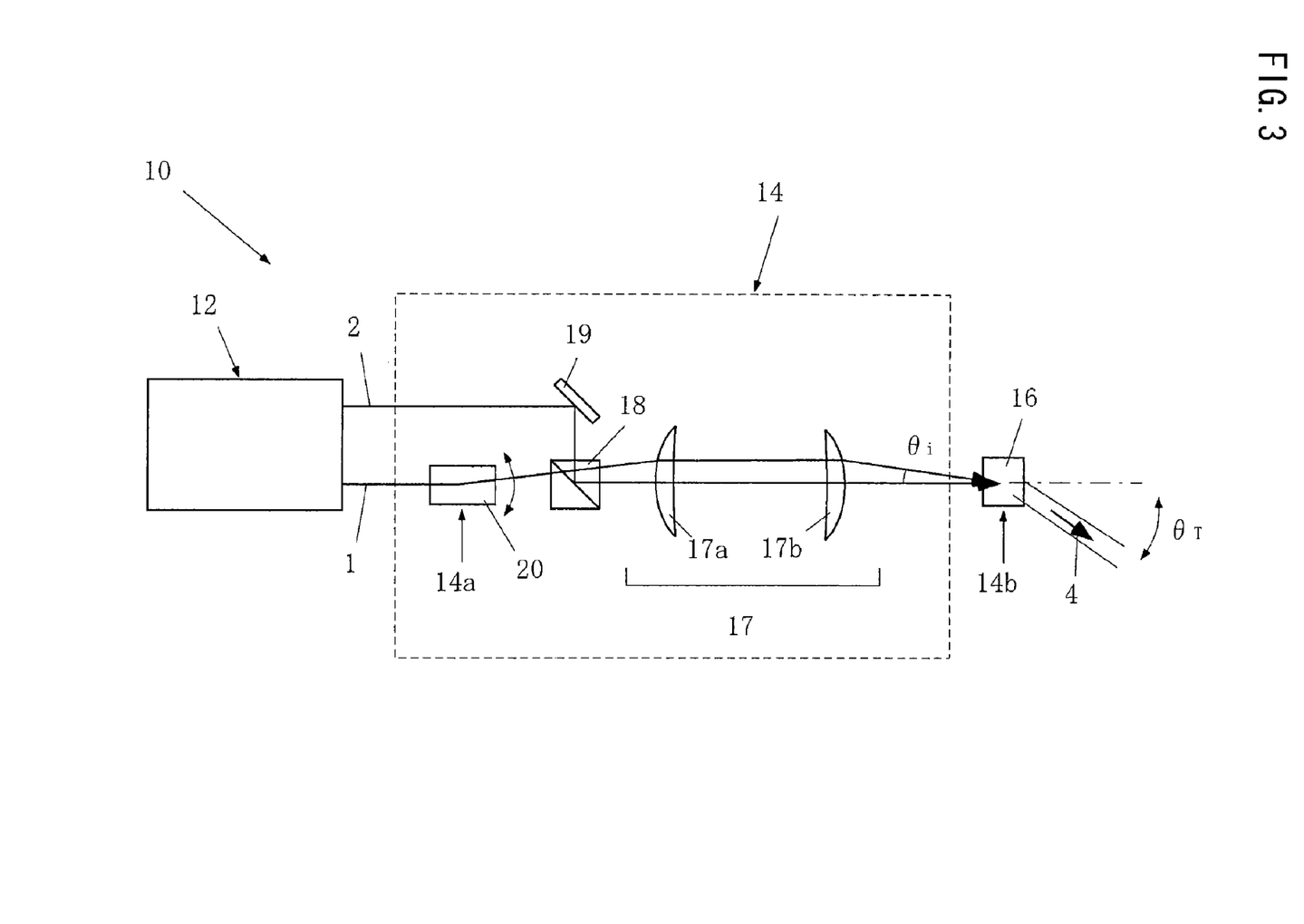
FIG. 3 is a diagram showing a first embodiment of a terahertz beam scanning apparatus according to the present invention.

FIG. 3 is a diagram showing a first embodiment of a terahertz beam scanning apparatus according to the present invention.

In the drawing, a terahertz beam scanning apparatus 10 according to the present invention includes a laser device 12, a laser optical system 14, and a terahertz generator 16.

The laser device 12 generates the first laser beam 1 and the second laser beam 2 having different wavelengths.

The laser optical system 14 focuses the first laser beam 1 and the second laser beam 2 on the same common focal point 14b. The laser optical system 14 is also configured to be capable of changing the incident angle $\theta_i$ of the first laser beam 1 (or the second laser beam 2) to the terahertz generator 16. Though a direction in which the incident angle $\theta_i$ is changed, namely, a scanning direction, is within the same plane in this example (on the paper surface in the drawing), deflection (scanning) may be two-dimensionally performed by, for example, an angle $\theta$ in a horizontal direction and an angle $\phi$ in a vertical direction.

The laser optical system 14 includes a confocal lens system 17, a beam coupler 18, a reflection mirror 19, and a laser beam deflection device 20, in this example.

The confocal lens system 17 is located between the common focal point 14b and a first focal point 14a upstream of the common focal point 14b, and focuses the first laser beam 1 passing through the first focal point 14a, on the common focal point 14b.

In this example, the confocal lens system 17 is composed of two convex lenses 17a and 17b (or a convex lens group). The convex lenses 17a and 17b respectively have focal lengths $F_1$ and $F_2$, and a distance between the convex lenses 17a and 17b is set to $F_1+F_2$. The focal lengths $F_1$ and $F_2$ are preferably equal to each other, though they may be different.

The beam coupler 18 is located between the first focal point 14a and the confocal lens system 17, and reflects the second laser beam 2 passing through a transfer position of the first focal point 14a (e.g. a position of the reflection mirror 19), onto an optical axis of the confocal lens system 17.

The laser beam deflection device 20 is an electro-optic deflector in this example. The laser beam deflection device 20 is located at the first focal point position 14a, and deflects the first laser beam 1 passing through the first focal point position 14a. Though a deflection direction, namely, a direction in which the laser beam is scanned, is within the same plane in this example (on the paper surface in the drawing), deflection (scanning) may be performed two-dimensionally.

Note that a galvano scanner may be used instead of or together with the electro-optic deflector and placed in the transfer position of the first focal point 14a or its neighborhood so that the second laser beam 2 is deflected two-dimensionally.

The terahertz generator 16 is a nonlinear optical element in this example. The terahertz generator 16 is located at the common focal point 14b of the laser optical system 14, and generates the terahertz beam 4 in a direction in which the incident angle $\theta_i$ is magnified by difference frequency mixing.

In the above-mentioned example shown in FIG. 3, a traveling direction of the first laser beam 1 is controlled by the high-speed light deflector (the electro-optic deflector 20), and the first laser beam 1 is coupled with the second laser beam 2 using the beam coupler 18. The first laser beam 1 and the second laser beam 2 are then incident on the nonlinear optical element 16 via the two lenses 17a and 17b. This structure is intended to change the incident angle $\theta_i$ of one laser beam (the first laser beam 1) while overlapping the first laser beam 1 and the second laser beam 2 on the nonlinear optical element 16.

Figure 4:
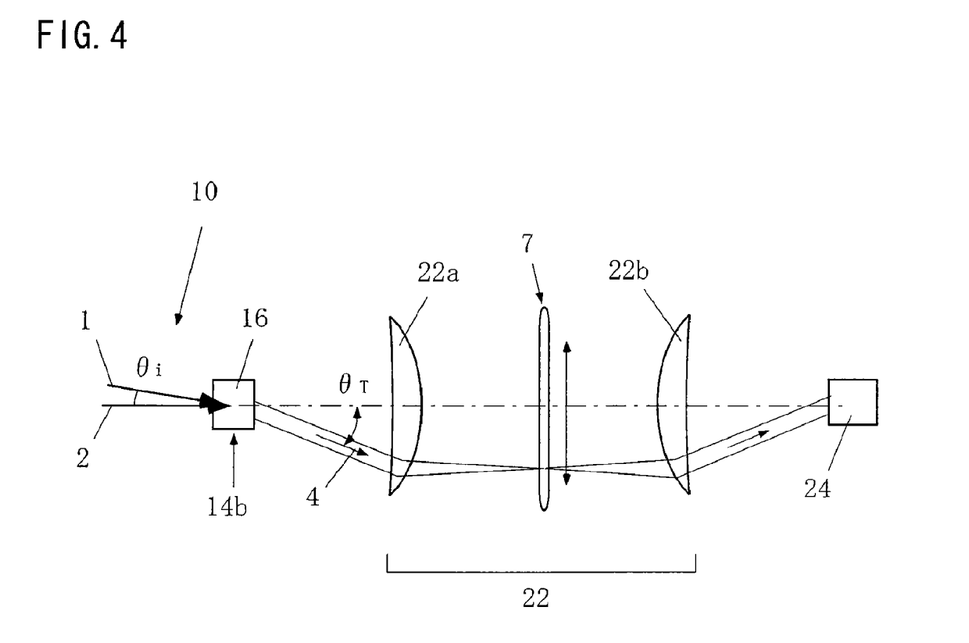
FIG. 4 is a diagram showing a structure when a terahertz beam scanning apparatus 10 according to the present invention is applied to a high-speed imaging system.

FIG. 4 is a diagram showing a structure when the terahertz beam scanning apparatus 10 according to the present invention is applied to a high-speed imaging system.

In the drawing, reference numeral 7 is a measurement sample, 22 is a confocal lens system, and 24 is a terahertz wave detector. The confocal lens system 22 is composed of two convex lenses 22a and 22b (or a convex lens group). The convex lenses 22a and 22b respectively have focal lengths $F_3$ and $F_4$, and a distance between the convex lenses 22a and 22b is set to $F_3+F_4$.

In this example, the two lenses 22a and 22b and the terahertz wave detector 24 are added downstream of the terahertz beam scanning apparatus 10 according to the present invention, with the measurement sample 7 being disposed between the lenses. The generated terahertz beam 4 travels in a direction perpendicular to the measurement sample 7 via the first lens 22a, and is focused on the sample 7. Subsequently, the terahertz beam 4 penetrating the sample 7 is incident on the terahertz wave detector 24 via the second lens 22b. Scanning the terahertz beam 4 moves its focus on the measurement sample 7. This structure is designed so that the beam 4 is always incident on the detector 24 regardless of in which direction the beam 4 is controlled.

Example 1

Figure 5:
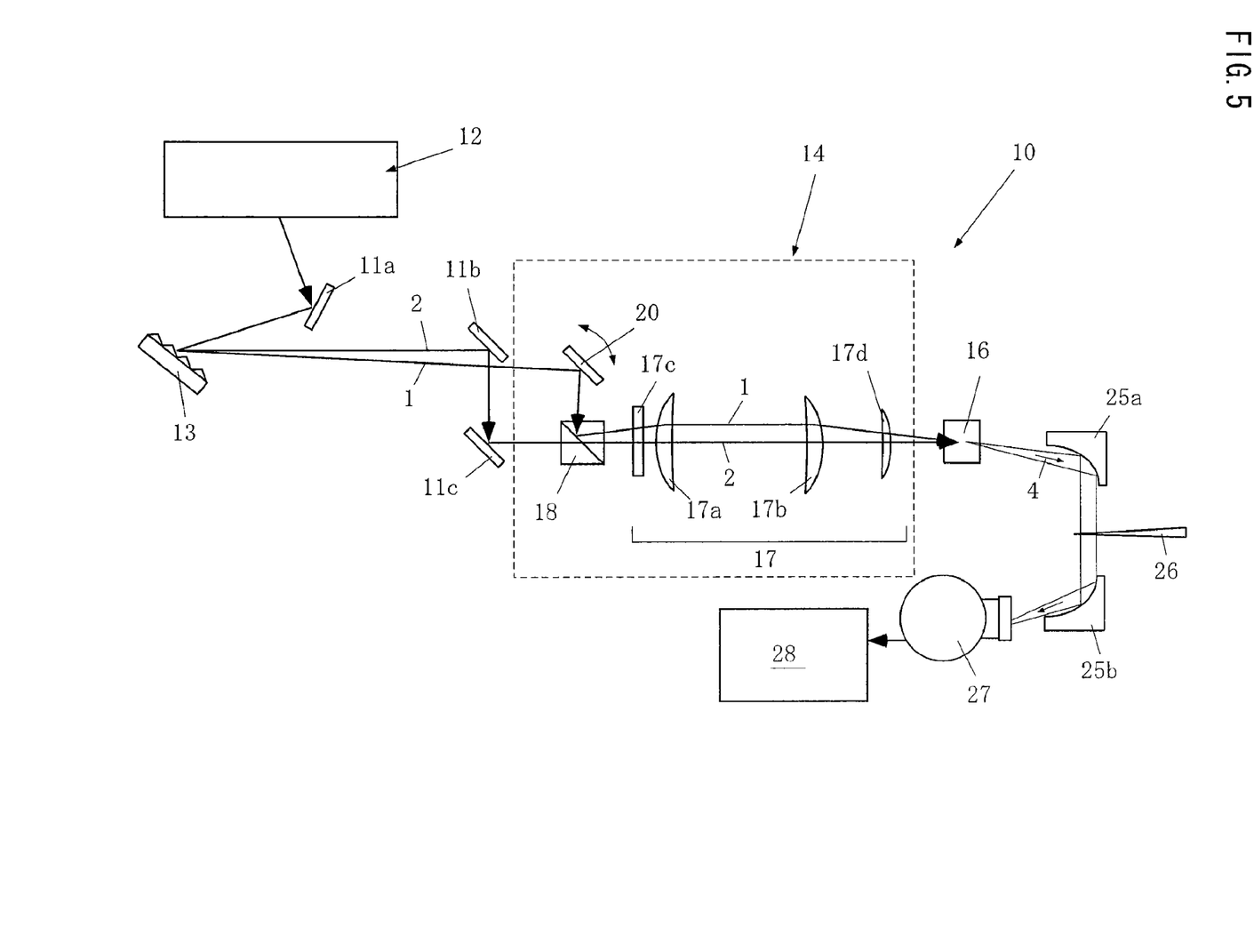
FIG. 5 is a diagram showing an overall structure of a test apparatus according to the present invention.

FIG. 5 is a diagram showing an overall structure of a test apparatus according to the present invention. In the drawing, the laser device 12 is a dual wavelength laser device (OPO) that generates, from the same position, the first laser beam 1 and the second laser beam 2 having different wavelengths, simultaneously in the same direction. The laser device 12 has the first laser beam 1 deflected to the laser beam deflection device 20 and the second laser beam 2 deflected to the beam coupler 18, using reflection mirrors 11a, 11b, and 11c and a diffraction grating 13.

In this example, the nonlinear optical element 16 is PPLN (one type of nonlinear optical element), and the laser beam deflection device 20 is a manually rotated mirror. In the drawing, reference numeral 17c is a $\lambda/2$ wavelength plate, 17d is an auxiliary lens, 25a and 25b are parabolic mirrors, 26 is a knife edge, 27 is a bolometer, and 28 is an oscilloscope.

The inventors of the present invention manufactured the terahertz beam scanning apparatus 10 shown in FIG. 5, and conducted a test for demonstrating the principle of the present invention.

In the test, the first laser beam 1 and the second laser beam 2 respectively having wavelengths of 1300 nm and 1306.8 nm were incident on a lithium niobate ($LiNbO_3$) crystal (called PPLN) with a periodical polarization inversion structure, thereby generating the terahertz wave 4 of 1.2 THz in frequency. The lithium niobate ($LiNbO_3$) crystal is one type of the above-mentioned nonlinear optical element 16.

Figure 6:
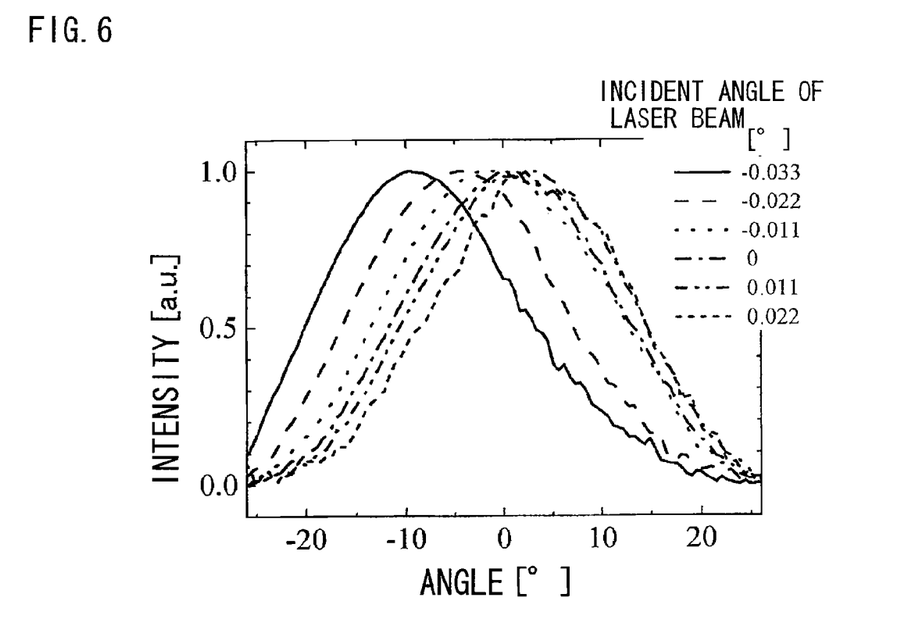
FIG. 6 is a diagram showing an intensity distribution of a terahertz beam 4 when the incident angle $\theta_i$ of a laser beam 1 is changed.

FIG. 6 is a diagram showing an intensity distribution of the terahertz beam 4 when changing the incident angle $\theta_i$ of the laser beam 1. In the drawing, the horizontal axis represents the radiation angle $\theta_T$ of the terahertz wave as seen from the nonlinear optical element 16 ($LiNbO_3$ crystal). Each figure in the drawing is the incident angle $\theta_i$ of the laser beam.

From the drawing, it can be confirmed that the whole terahertz beam 4 is significantly shifted merely by tilting the incident angle $\theta_i$ of the laser beam 1 slightly by 0.011°.

Figure 7:
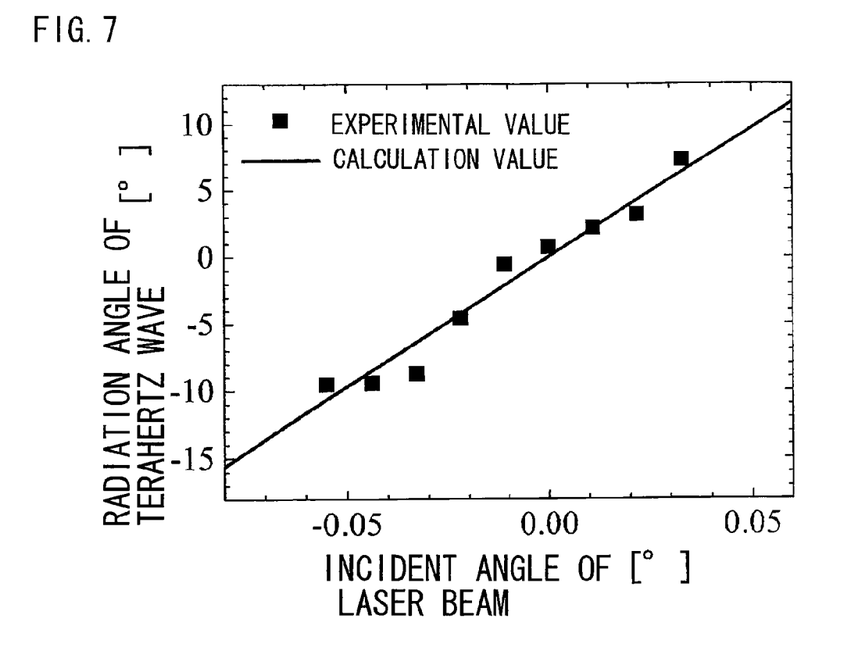
FIG. 7 is a diagram showing a relation of the radiation angle $\theta_T$ of the terahertz beam 4 to the incident angle $\theta_i$ of the laser beam 1.

FIG. 7 is a diagram showing a relation of the radiation angle $\theta_T$ of the terahertz beam 4 to the incident angle $\theta_i$ of the laser beam 1.

In the drawing, the solid line represents a calculation value obtained from the relation expressed by Equation (5). In the drawing, though there are slight errors, an experimental result shows a value sufficiently close to the calculation value, and so it can be confirmed that the terahertz beam 4 is scanned with an angle which is 200 times relative to a change in incident angle $\theta_i$.

Figure 8:
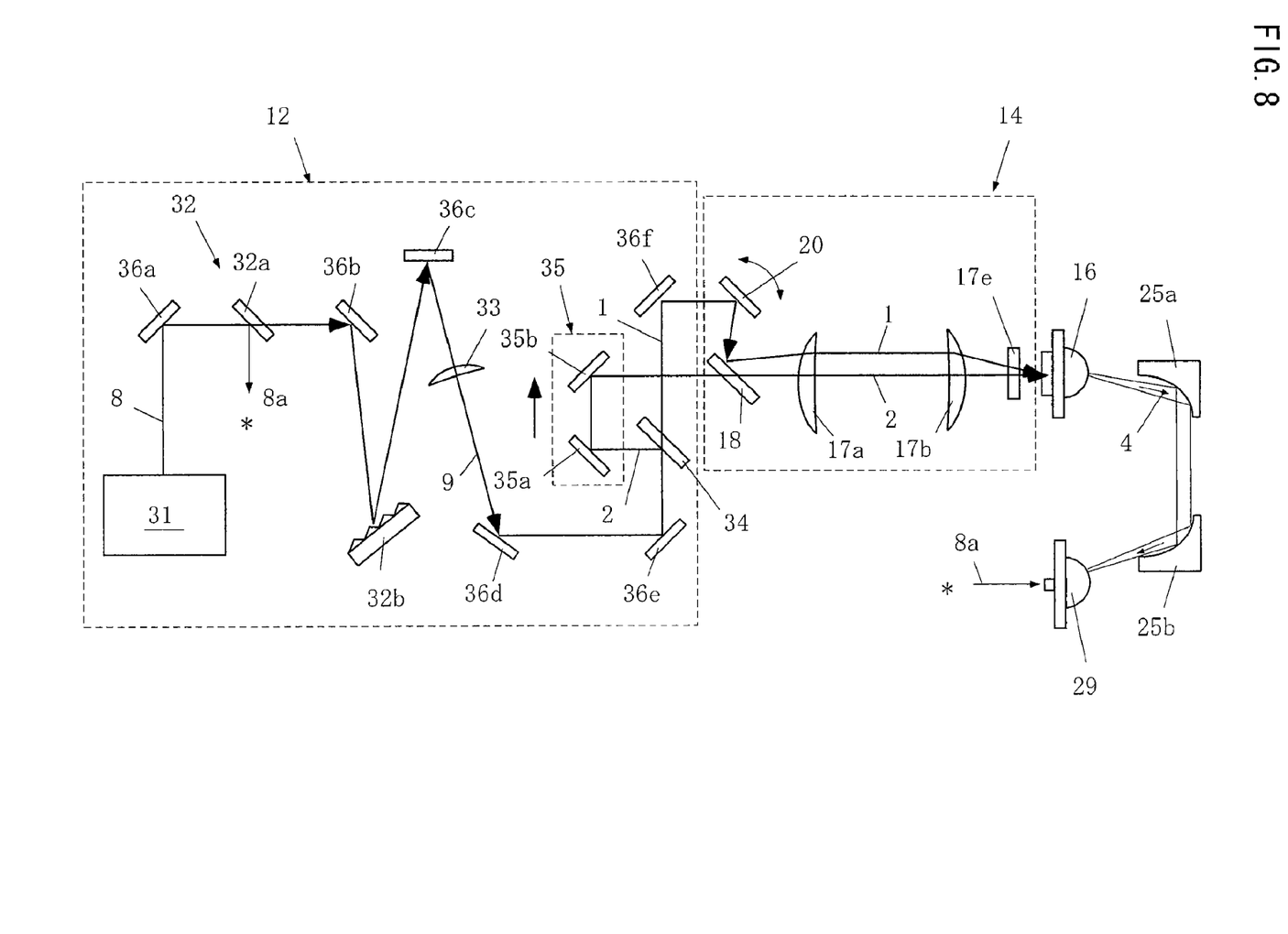
FIG. 8 is a diagram showing a second embodiment of the terahertz beam scanning apparatus according to the present invention.

FIG. 8 is a diagram showing a second embodiment of the terahertz beam scanning apparatus according to the present invention.

In the drawing, the laser device 12 is composed of a broadband laser device 31, a dispersive element 32, a cylindrical lens 33, a beam splitter 34, and a shift optical system 35. Reference numerals 36a to 36f are reflection mirrors.

The broadband laser device 31 is a femtosecond laser in this example, and generates a broadband laser beam 8 of 100 fs and 90 MHz.

The dispersive element 32 is composed of a semi-permeable mirror 32a and a diffraction grating 32b, and extracts a part of the laser beam 8 as probe light 8a and spatially disperses a wavelength component of the other part of the laser beam 8.

The cylindrical lens 33 collimates the dispersed laser beam 8 to convert it to a linear beam 9 that extends in a single direction in cross-sectional shape.

The beam splitter 34 divides the linear beam 9 into a first linear beam 1 and a second linear beam 2 which are approximately identical to each other. The first linear beam 1 is the first laser beam 1 in the first embodiment, and the second linear beam 2 is the second laser beam 2 in the first embodiment.

The shift optical system 35 is composed of reflection mirrors 35a and 35b, and shifts the second linear beam 2 in the above-mentioned single direction.

In this example, the terahertz generator 16 is a stripline photoconductive antenna, and reference numeral 17e is a cylindrical lens and 29 is a dipole antenna.

Figure 9A:
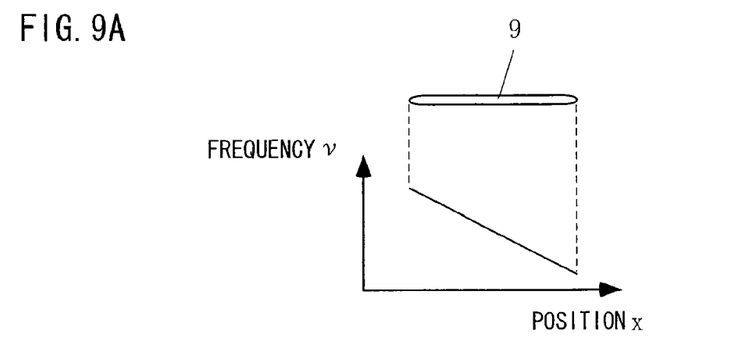
FIGS. 9A to 9C are diagrams showing a principle of the apparatus shown in FIG. 8.
Figure 9B:
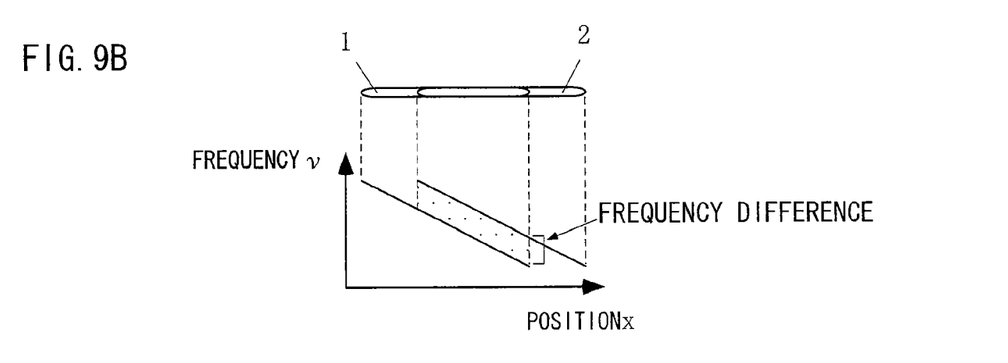
Figure 9C:
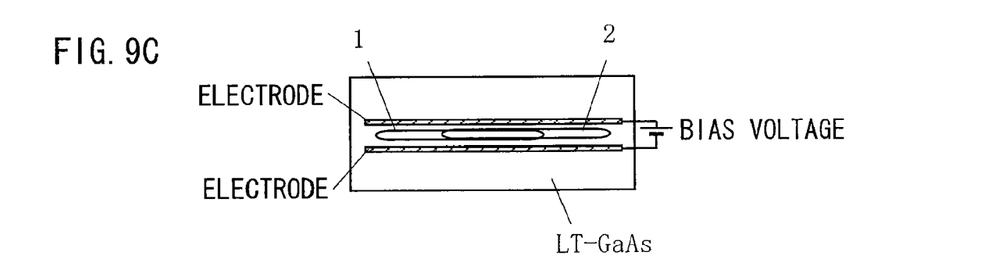

FIGS. 9A to 9C are diagrams showing a principle of the apparatus shown in FIG. 8. FIG. 9A is a diagram showing spatial dispersion of the linear beam 9, FIG. 9B is a diagram showing a situation where the first linear beam 1 and the second linear beam 2 are spatially overlapped, and FIG. 9C is a diagram showing a structure of the stripline photoconductive antenna.

In FIGS. 8 and 9A to 9C, the spatial dispersion is provided to the broadband laser beam 8 having various frequency components through the use of the diffraction grating 32b (or a prism, etc.), thereby forming the linear beam 9 whose frequency is linearly distributed according to position, as shown in FIG. 9A.

Moreover, the linear beam 9 is divided to prepare the approximately identical first linear beam 1 and second linear beam 2, with one of the beams (the second linear beam 2) being shifted laterally so as to overlap with the first linear beam 1, as shown in FIG. 9B. Here, in each position within an overlapping region, the two laser beams differ in frequency, but the difference between the two beams is the same.

Accordingly, by irradiating the stripline photoconductive antenna shown in FIG. 9C (or other nonlinear optical element) with the first linear beam 1 and the second linear beam 2, difference frequency mixing is induced in the whole overlapping region, as a result of which the terahertz beam 4 of a single frequency is generated.

Furthermore, when each frequency component of the spatially dispersed beams is in phase and an equiphase plane is distributed perpendicularly to a traveling direction, slightly changing the incident angle $\theta_i$ of one of the spatially dispersed beams (e.g. the first linear beam 1) causes a phase difference similar to the case where a single wavelength laser beam is used as shown in FIGS. 1A to 1C. This enables the terahertz beam 4 to be scanned in a direction in which the incident angle $\theta_i$ is magnified.

Example 2

Figure 10:
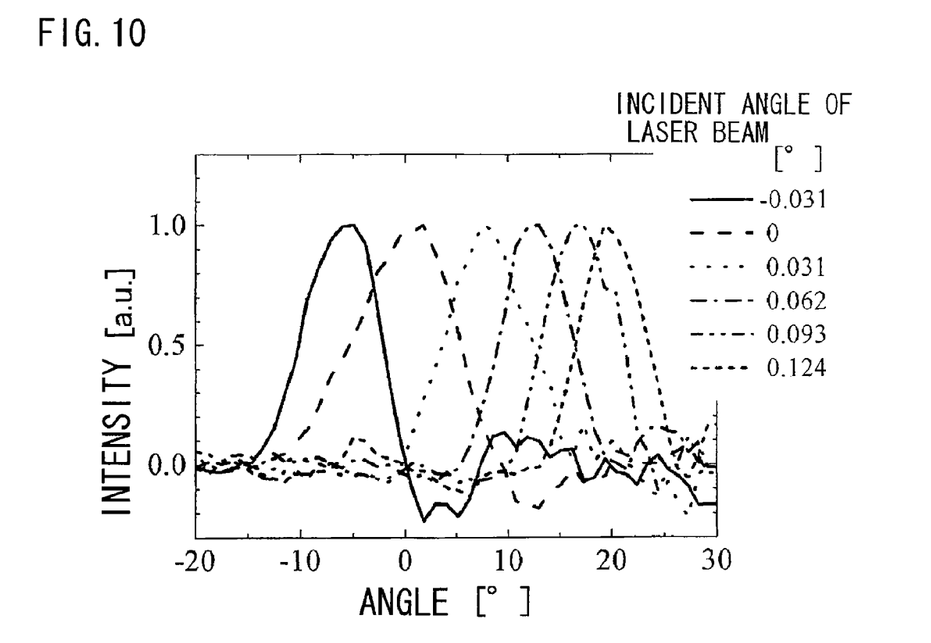
FIG. 10 is a diagram showing an intensity distribution of the terahertz beam 4 when the incident angle $\theta_i$ of the laser beam 1 is changed.
Figure 11:
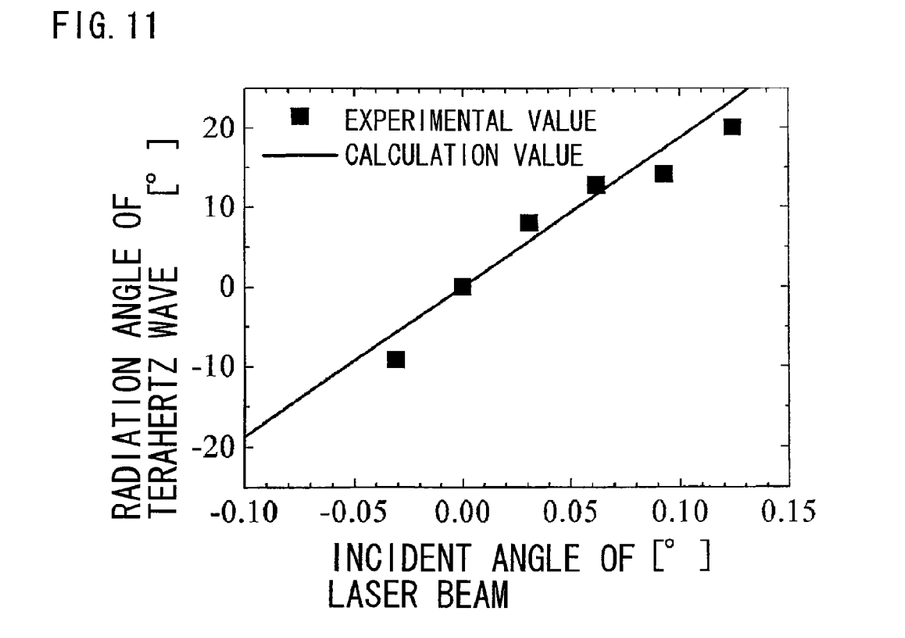
FIG. 11 is a diagram showing a relation of the radiation angle $\theta_T$ of the terahertz beam 4 to the incident angle $\theta_i$ of the laser beam 1.

FIGS. 10 and 11 are diagrams showing test results of the terahertz beam scanning apparatus shown in FIG. 8. FIG. 10 is a diagram showing an intensity distribution of the terahertz beam 4 when changing the incident angle $\theta_i$ of the laser beam 1, and FIG. 11 is a diagram showing a relation of the radiation angle $\theta_T$ of the terahertz beam 4 to the incident angle $\theta_i$ of the laser beam 1.

From FIG. 10, it can be understood that the traveling direction of the terahertz beam 4 is significantly changed merely by tilting the incident angle $\theta_i$ of the laser beam 1 slightly, as with the result shown in FIG. 6.

Moreover, from FIG. 11, it can be understood that, when the incident angle $\theta_i$ of the laser beam 1 is changed in a slight range of 0.155°, the terahertz beam 4 is scanned with a magnified angle of 29° which is 187 times 0.155°. In addition, an experimental value is in a good agreement with a calculation value.

An advantage of the second embodiment lies in that a light utilization rate can be enhanced by using a (multimode) laser beam having various wavelength components. Besides, to scan the beam according to a phased array principle, there is a requirement that a generation region of the terahertz wave is sufficiently wide relative to a wavelength of the terahertz wave. In the second embodiment, the terahertz beam is generated from the whole beam overlapping region shown in FIG. 9(B), which is very suitable for beam scanning.

In a method according to the present invention, through the use of the apparatus of the first or second embodiment described above, the first laser beam 1 and the second laser beam 2 having different wavelengths are generated by the laser device 12, the relative incident angle $\theta_i$ between the first laser beam and the second laser beam to the terahertz generator is changed and the first laser beam and the second laser beam are focused on the same common focal point 14b by the laser optical system 14, and the terahertz beam 4 is generated in a direction in which the incident angle $\theta_i$ is magnified by the terahertz generator 16 located at the common focal point 14b.

Moreover, as is clear from the above-mentioned examples, when generating the terahertz beam 4 by difference frequency mixing by irradiating the terahertz generator 16 (e.g. a nonlinear optical element) with the first laser beam 1 and the second laser beam 2 (e.g. two infrared lasers) having different wavelengths, slightly changing the incident angle $\theta_i$ of the laser beam 1 as one of the laser beams enables the terahertz beam 4 to be scanned at high speed with an angle several hundred times wider than the incident angle.

In particular, by controlling the incident angle $\theta_i$ of one of the laser beams using an electro-optic deflector as the laser beam deflection device 20, the scanning speed of the terahertz beam 4 can be increased 1000 times as compared with conventional mechanical scanning.

(Advantages Over Conventional Techniques)

The present invention is superior to conventional techniques in the following points.

(1) Speedup by Non-mechanical Operation

A galvano scanner is conventionally used as a device for scanning a laser beam at a relatively high speed. The galvano scanner mechanically rotates a mirror using a servomotor, and has a scanning speed of about 1 kHz (meaning that 1 msec is required for one round trip of the beam).

In the case of using the galvano scanner as the laser beam deflection device 20 according to the present invention, a change (e.g. ±40°) in radiation angle $\theta_T$ of the terahertz beam is equal to or more than 100 times a change (e.g. ±0.1°) in incident angle $\theta_i$ of the laser beam. This allows for a significant reduction in deflection angle of the galvano scanner, so that a scanning speed higher than 1 kHz can be attained.

Moreover, in the case of using an electro-optic deflector as the laser beam deflection device 20 according to the present invention, the electro-optic deflector exhibits a scanning speed as high as 1 MHz, and therefore a speed increase of 1000 times or more can be achieved as compared with mechanical scanning.

(2) Reductions in Apparatus Size and Cost

A phased array antenna is conventionally known as a non-mechanical beam scanning technique. The phased array antenna distributes a terahertz wave output from an oscillator to each array element, and feeds a corresponding antenna using a variable phase shifter for each element. Here, by performing control that causes an equivalent change in phase, a wave front of a radio wave emitted from the whole antenna is tilted to thereby scan the beam.

However, the phased array antenna includes a lot of elements. Accordingly, in the case of forming an array antenna of a large scale, a lot of variable phase shifters corresponding to such a large array antenna are required. Thus, there is a disadvantage of increases in overall size and cost of the apparatus.

In the present invention, on the other hand, no variable phase shifter is required, and beam scanning can be realized with only one light deflector. This allows for reductions in apparatus size and cost.

(3) Wide Angle and High Resolution

A most significant feature of the present invention missing in conventional techniques is an "angle increase effect" that a terahertz beam can be scanned with an angle several hundred times wider than a laser beam incident angle. Previous studies have reported examples of tilting the incident angle of the laser beam to control the terahertz beam in the same angular direction as the incident angle. In these examples, since a light deflector angular range is about several degrees, a scanning angle of the terahertz beam is also limited to several degrees.

In the present invention, however, the angle is increased, so that the terahertz beam can be scanned over a sufficiently wide range. In addition, since an angular resolution of the light deflector is about 2 millidegrees, when applying this to an imaging apparatus, a resolution of 1000 or more can be attained. This contributes to sufficient imaging performance.

INDUSTRIAL APPLICATION EXAMPLES (1) High-speed Nondestructive Inspection Apparatus In the case of industrially applying the present invention, due to its high scanning speed, the present invention is effective when measuring a large amount of objects. Terahertz waves have a property of penetrating paper and plastics and reflecting off metals. Hence, it is possible to nondestructively detect, for example, foreign matter such as metal pieces in foods or products. Terahertz waves also have a property of having a unique absorption spectrum depending on substance, so that it is also possible to discover explosives or banned drugs concealed in mail and the like.

As an example, in a state where an inspection object carried on a carriage such as a belt conveyor is being moved in a product production line or a mail delivery line, the whole inspection object can be imaged to obtain a radioscopic image by scanning a focus of a terahertz wave perpendicularly to the movement of the inspection object through the use of the terahertz beam scanning apparatus according to the present invention.

Here, since the measurement is performed at high speed, the inspection apparatus can be directly added to the production line without a decrease in production speed. Terahertz waves also have an advantage that they cause no radiation exposure on human body as compared with X-ray measurement and are easy to handle for users in product factories or post offices. Thus, the terahertz beam scanning apparatus according to the present invention is highly useful as a practical technique for industrial application.

(2) Adaptive Antenna for Mobile Communication

Terahertz waves have a frequency several hundred times higher than that of microwaves, and so are expected to be used in ultra-broadband wireless communication much faster than current data transmission speeds. This being so, the terahertz beam scanning method according to the present invention is applicable not only to imaging but also to adaptive antennas for base stations in such wireless communication.

For instance, a signal is transmitted from a transmitter to the beam scanning apparatus, and a terahertz beam carrying the signal is emitted to a space. At this time, by concentrating the beam in a direction of a mobile communication terminal, a reception strength at the terminal is enhanced, with it being possible to ensure a communication line of high quality. In addition, an effect of suppressing line degradation caused by interference can also be attained. Furthermore, improvements based on this beam scanning method can lead to development of techniques whereby a radio wave emitted from a terminal is received and its incoming direction is detected, and a transmission beam is scanned autonomously toward the terminal or the beam is scanned so as to automatically track a movement of the terminal, thereby maintaining line quality. Besides, a new antenna that performs beam scanning and tracking independently for each of a plurality of terminals can be expected to be developed by forming a plurality of terahertz beams.

(Scope of Application of the Present Invention)

(1) The present invention is applicable to beam scanning of not only terahertz waves but also millimeter waves (30 GHz to 300 GHz).

(2) Examples of the nonlinear optical element include a nonlinear optical crystal and a photoconductive element.

(3) The nonlinear optical element generating a terahertz wave may be an array structure.

(4) The number of elements in the case of the array structure may be any number equal to or more than 2.

(5) A band of laser beams is visible light or infrared radiation.

(6) Examples of the laser beam deflection device include an electro-optic deflector, an acousto-optic deflector, and a rotation mirror.

(7) A reflection mirror may be used instead of a lens.

(8) Terahertz beam scanning in a two-dimensional direction is also possible.

It is to be noted that the present invention is not limited to the above-mentioned examples and embodiments, and various modifications can be made without departing from the scope of the present invention.

The invention claimed is:

1. A terahertz beam scanning apparatus comprising:
a laser device that generates a first laser beam and a second laser beam having different wavelengths;
a laser optical system that focuses the first laser beam and the second laser beam on a same common focal point; and
a terahertz generator that is located at the common focal point and generates a terahertz beam by difference frequency mixing,
wherein the laser optical system is configured to be capable of changing a relative incident angle between the first laser beam and the second laser beam to the terahertz generator.

2. The terahertz beam scanning apparatus according to claim 1, wherein the laser optical system includes:
a confocal lens system that is located between the common focal point and a first focal point upstream of the common focal point, and focuses the first laser beam passing through the first focal point, on the common focal point;
a beam coupler that is located between the first focal point and the confocal lens system, and reflects the second laser beam passing through a transfer position of the first focal point, onto an optical axis of the confocal lens system; and
a laser beam deflection device that is located at a position of the first focal point or the transfer position, and deflects the first laser beam or the second laser beam passing through the position.

3. The terahertz beam scanning apparatus according to claim 2, wherein the laser beam deflection device is an electro-optic deflector or a galvano scanner.

4. The terahertz beam scanning apparatus according to claim 1, wherein the laser device is a dual wavelength laser device that simultaneously generates the first laser beam and the second laser beam having the different wavelengths.

5. The terahertz beam scanning apparatus according to claim 2, wherein the laser device includes: a broadband laser device that generates a broadband laser beam; a dispersive element that spatially disperses a wavelength component of the broadband laser beam; a cylindrical lens that collimates the dispersed broadband laser beam to convert the dispersed broadband laser beam to a linear beam that extends in a single direction in cross sectional shape; a beam splitter that divides the linear beam into a first linear beam and a second linear beam which are approximately identical to each other; and a shift optical system that shifts the first linear beam or the second linear beam in the single direction, and
wherein the first linear beam is the first laser beam, and the second linear beam is the second laser beam.

6. A terahertz beam scanning method comprising:
generating a first laser beam and a second laser beam having different wavelengths;
focusing the first laser beam and the second laser beam on a same common focal point, while changing a relative incident angle between the first laser beam and the second laser beam to a terahertz generator; and
generating a terahertz beam in a direction in which the incident angle is magnified, by the terahertz generator located at the common focal point.

* * * * *